United States Patent
Yakou

[11] Patent Number: 5,161,846
[45] Date of Patent: Nov. 10, 1992

[54] HAND APPARATUS

[75] Inventor: Takeshi Yakou, Tokyo, Japan

[73] Assignee: Canon Kabushiki Kaisha, Tokyo, Japan

[21] Appl. No.: 672,759

[22] Filed: Mar. 22, 1991

Related U.S. Application Data

[63] Continuation of Ser. No. 396,989, Aug. 22, 1989, abandoned.

[30] Foreign Application Priority Data

Aug. 23, 1988 [JP] Japan .................. 63-207359

[51] Int. Cl.$^5$ .......................... B25J 15/10; B66C 1/66
[52] U.S. Cl. ................... 294/106; 294/86.4; 901/32; 901/39
[58] Field of Search ............... 294/106, 86.4, 902, 294/907, 2; 901/31, 32, 33, 34, 39, 46

[56] References Cited

U.S. PATENT DOCUMENTS

| | | | |
|---|---|---|---|
| 3,866,966 | 2/1975 | Skinner, II | 294/106 |
| 3,901,547 | 8/1975 | Skinner, II | 294/88 |
| 4,179,783 | 12/1979 | Inoyama et al. | 29/281.5 |
| 4,367,893 | 1/1983 | Berg | 294/86.4 X |
| 4,529,237 | 7/1985 | Gupta et al. | 294/86.4 |
| 4,579,380 | 4/1986 | Zaremsky et al. | 901/33 X |
| 4,598,942 | 7/1986 | Shum et al. | 294/106 |
| 4,600,357 | 7/1986 | Coules | 901/34 X |
| 4,621,331 | 11/1986 | Iwata | 901/33 X |
| 4,623,183 | 11/1986 | Aomori | 294/86.4 |
| 4,645,411 | 2/1987 | Madwed | 294/106 X |
| 4,653,793 | 3/1987 | Guinot et al. | 294/86.4 |
| 4,667,997 | 5/1987 | Udagawa et al. | 294/86.4 |
| 4,828,276 | 5/1989 | Link et al. | 294/106 X |
| 4,850,631 | 7/1989 | Dotsko | 294/86.4 |
| 4,921,293 | 5/1990 | Ruoff et al. | 294/106 X |

FOREIGN PATENT DOCUMENTS

| | | | |
|---|---|---|---|
| 57-1686 | 1/1982 | Japan . | |
| 60-74986 | 5/1985 | Japan . | |
| 61-33883 | 2/1986 | Japan . | |
| 1328193 | 8/1987 | U.S.S.R. | 294/86.4 |

Primary Examiner—Margaret A. Focarino
Assistant Examiner—Dean J. Kramer
Attorney, Agent, or Firm—Fitzpatrick, Cella, Harper & Scinto

[57] ABSTRACT

A part gripping hand apparatus according to the present invention includes a body, drive motors disposed at three points on the body which are not on a straight line, arms integrally mounted on the drive shafts of the drive motors and extending from the center of rotation along radial directions with a predetermined length, finger members mounted on the ends of the arms, and a control unit for positioning and controlling the finger members at any position with the circumference of each of the finger members as the operation range.

3 Claims, 11 Drawing Sheets

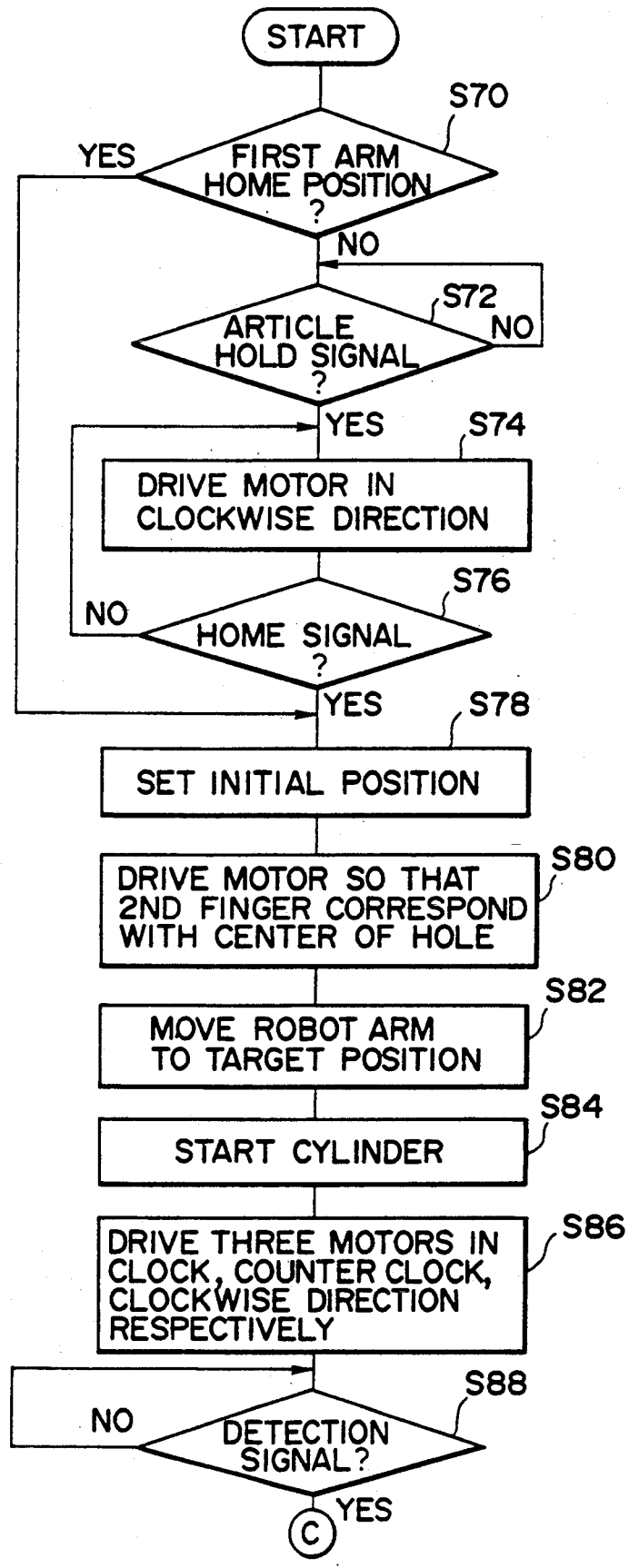

HAND APPARATUS

This application is a continuation of application Ser. No. 396,989 filed Aug. 22, 1989, now abandoned.

BACKGROUND OF THE INVENTION

1. Field of the Invention

This invention relates to a part gripping hand apparatus for gripping parts handled in the work assembling operation.

2. Related Background Art

Heretofore, hand apparatuses for gripping parts assembled in the parts assembling work have been prepared in advance for exclusive use for these parts in conformity with the shapes of the respective parts and setting has been done so as to change the hand apparatus each time the parts to be gripped are changed.

For example, where the parts are of a round shape, there has heretofore been available a collet chuck which can grip almost all rounded parts irrespective of their sizes as long as the shapes thereof are round. On the other hand, there is known a hand apparatus having two finger members and gripping a part by nipping the part from the opposite sides thereof by these finger members.

However, hand apparatuses of conventional construction are constructed as hand apparatuses for exclusive use for respective shapes and therefore can grip parts irrespective of their sizes if the shapes of the parts are those to which the hand apparatuses are directed, but cannot grip parts well if the shapes of the parts are not those to which the hand apparatuses are directed, and this leads to the necessity of preparing various hand apparatuses, which in turn leads to problems in terms of both cost and space.

There are Japanese Laid-open Patent Application No. 57-1686 and Japanese Laid-open Utility Model Application No. 60-74986 as the prior art with respect to the present invention, particularly, an apparatus provided with three fingers and gripping an article by the three fingers being driven by a drive shaft.

Also, there is Japanese Laid-open Patent Application No. 61-33883 (U.S. Pat. No. 4,598,942) as a gripping apparatus of a robot for automatically gripping an article or a work piece which comprises a motor rotatable selectively in one direction and the opposite direction and having a shaft working as an output drive member, a plurality of gripper assemblies capable of being driven by said output drive member, each of said gripper assemblies having gripper finger means protruding laterally from the distal end of a rotatable shaft having a lever fixed to the shaft and protruding laterally from the shaft, connecting means disposed between the shaft of each said gripper assembly and said output drive member, and means for controlling said connecting means to limit the torque transmitted from said output member to the shaft of each said gripper assembly through said connecting means to a relatively low value until at least all said gripper fingers contact said article, and change said torque to a relatively high torque of a magnitude suitable for handling said article without causing slippage after said gripper fingers have contacted said article.

SUMMARY OF THE INVENTION

The present invention has been made in view of the above-noted problems and an object thereof is to provide a part gripping hand apparatus which can grip parts of various shapes reliably.

Another object of the present invention is to provide a hand apparatus which has at least three fingers for gripping articles, each of said fingers being provided with independent drive means so that the amounts and directions of movement of said fingers can be made different from one another, each of said drive means being capable of performing an operation conforming to the article.

The present invention also proposes a hand apparatus in which first arms are fixed to three independently rotatable shafts, respectively, and a finger for gripping an article is attached to each of said first arms, each of said fingers being provided with a second finger expanding and contracting relative to said finger.

A further object of the present invention is to propose a hand apparatus which has at least three finger members to which a drive force is imparted by drive means such as a motor and in which the reliability of gripping an article can be improved.

The present invention achieves the above object by rotating said finger members by the drive force of said motor to thereby grip an article, and providing torque holding means for said drive force to keep a predetermined rotational torque value.

The present invention further proposes a hand apparatus in which a signal indicative of the fact that an article is gripped by the finger member of the hand apparatus is output and which is adapted to shift to the next process operation by said grip signal.

DESCRIPTION OF THE PREFERRED EMBODIMENTS

The construction of an embodiment of a part gripping hand apparatus according to the present invention will hereinafter be described in detail with reference to the accompanying drawings.

Figure 1:
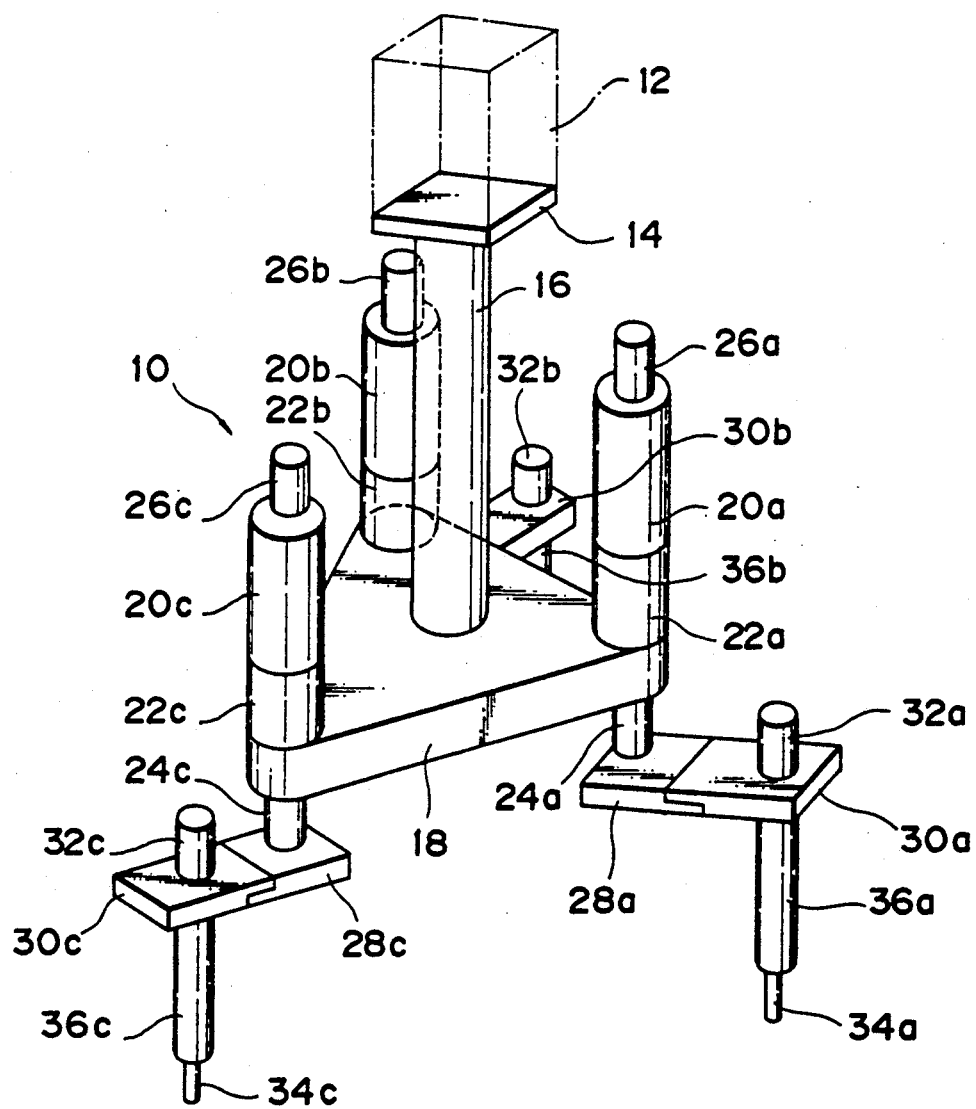
FIG. 1 is a perspective view showing the construction of an embodiment of an article gripping hand apparatus according to the present invention.

As shown in FIG. 1, the hand apparatus 10 of this embodiment is mounted on the arm 12 of a robot, not shown, and is provided with a mounting member 14 removably mounted on the end of the robot arm 12. A hand body 18 is connected to the mounting member 14 through a connecting rod 16 extending along a vertical direction.

The hand body 18 is formed by a flat plate having its planar shape set to a substantially triangular shape, and reversible servo-motors 20a, 20b and 20c as drive motors are disposed on the corners of the hand body 18. In other words, the output shafts 24a, 24b and 24c of the three servo-motors 20a, 20b and 20c, respectively, are disposed on the hand body 18 in such a manner that they are positioned at the respective vertical angles of the substantially triangular shape in a state in which they are not positioned on a straight line. The lower end of the above-mentioned connecting rod 16 is set so as to be connected at the center of gravity of the hand body 18.

The servo-motors 20a, 20b and 20c each are provided with a drive shaft (not shown) extending along a vertical direction, and speed reduction mechanisms 22a, 22b and 22c are connected to the lower ends of the respective drive shaft. The lower ends of the output shafts 24a, 24b and 24c of these speed reduction mechanisms 22a, 22b and 22c, respectively, extend through and downwardly of the hand body 18. On the other hand, the upper ends of the respective drive shafts protrude upwardly from the corresponding servo-motors 20a, 20b and 20c, and encoders 26a, 26b and 26c for detecting the amounts of rotation of the respective drive shafts are connected to said upper ends, respectively.

Mounting plates 28a, 28b and 28c are secured to the lower ends of the respective output shafts 24a, 24b and 24c, and finger mounting plates 30a, 30b and 30c are removably connected to the outer edges of the respective mounting plates 28a, 28b and 28c. The mounting plates 28a, 28b, 28c and the finger mounting plates 30a, 30b, 30c connected to each other constitute first arms $L_1$, $L_2$ and $L_3$ extending from the centers of rotation of the respective servo-motors 20a, 20b and 20c along the radial directions.

Drive cylinder mechanisms 32a, 32b and 32c driven with compressed air as a drive source are mounted on the upper surfaces of the respective finger mounting plates 30a, 30b and 30c, and pistons (third arms) 34a, 34b and 34c adapted to be extended and retracted by the piston actions of these drive cylinder mechanisms 32a, 32b and 32c are supported forward and backward movement along a vertical direction and are taken out downwardly in a state in which they extend through the corresponding finger mounting plates 30a, 30b and 30c.

On the other hand, to the lower surfaces of the finger mounting plates 30a, 30b and 30c, fixed first finger members (second arms) 36a, 36b and 36c each formed of a hollow cylindrical member are secured coaxially with the corresponding drive cylinder mechanisms 32a, 32b and 32c. The lower ends of the pistons 34a, 34b and 34c extend downwardly from the lower ends of the corresponding first finger members 36a, 36b and 36c in a state in which the pistons extend through the first finger members 36a, 36b and 36c, and constitute movable second finger members.

The movable second finger members 34a, 34b and 34c are driven inwardly by compressed air being introduced into one input port of each of the corresponding drive cylinder mechanisms 32a, 32b and 32c, and are set so as to be drawn into the corresponding fixed first finger members 36a, 36b and 36c. On the other hand, the movable second finger members 34a, 34b and 34c are driven outwardly by compressed air being introduced into the other input ports of the corresponding drive cylinder mechanisms 32a, 32b and 32c, and are set so as to be forced out downwardly from the corresponding first finger members 36a, 36b and 36c.

As is apparent from the foregoing description, the movable second finger members 34a, 34b and 34c are set to a smaller diameter than the first finger members 36a, 36b and 36c.

Figure 2:
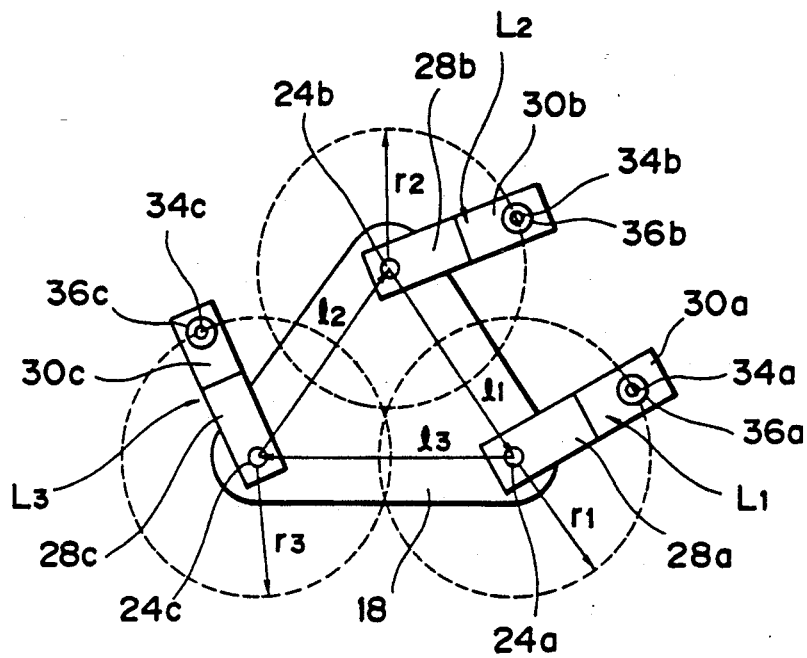
FIG. 2 is a top plan view showing the turned state of three first arms.

Here, when as shown in FIG. 2, the distances between the centers of rotations of the three servomotors 20a, 20b and 20c are $l_1$, $l_2$ and $l_3$ and the distances between the centers of rotation of the corresponding servo-motors 20a, 20b and 20c on the first arms $L_1$, $L_2$ and $L_3$ mounted on the servo-motors 20a, 20b and 20c and the drive shafts of the drive cylinder mechanisms 32a, 32b and 32c, i.e., the working radii on the first arms $L_1$, $L_2$ and $L_3$, are $r_1$, $r_2$ and $r_3$. there are prescribed the following relations between $l_1$, $l_2$, $l_3$ and $r_1$, $r_2$, $r_3$:

$r_1 < \min(l_1, l_3)$ $r_2 < \min(l_1, l_2)$ $r_3 < \min(l_2, l_3)$ where min (a, b) is defined as a function indicating that the minimum value of a plurality of numerical values a and b is taken.

From these relations, the radii r of the first arms L mounted on one servo-motor is set to a value smaller than the shorter distance ( of the distance l to the centers of rotation of the other two servo-motors. In other words, each of the first arms $L_1$, $L_2$ and $L_3$ is set so as to be freely rotatable through 360° about its own center of rotation and as a result, the first finger members 36a, 36b and 36c can freely turn on the circumferences of the radii $r_1$, $r_2$ and $r_3$.

The radii $r_1$, $r_2$ and $r_3$ of these first arms $L_1$, $L_2$ and $L_3$, respectively, can be freely set by setting the lengths of the finger mounting plates 30a, 30b and 30c to different lengths.

Figure 3:
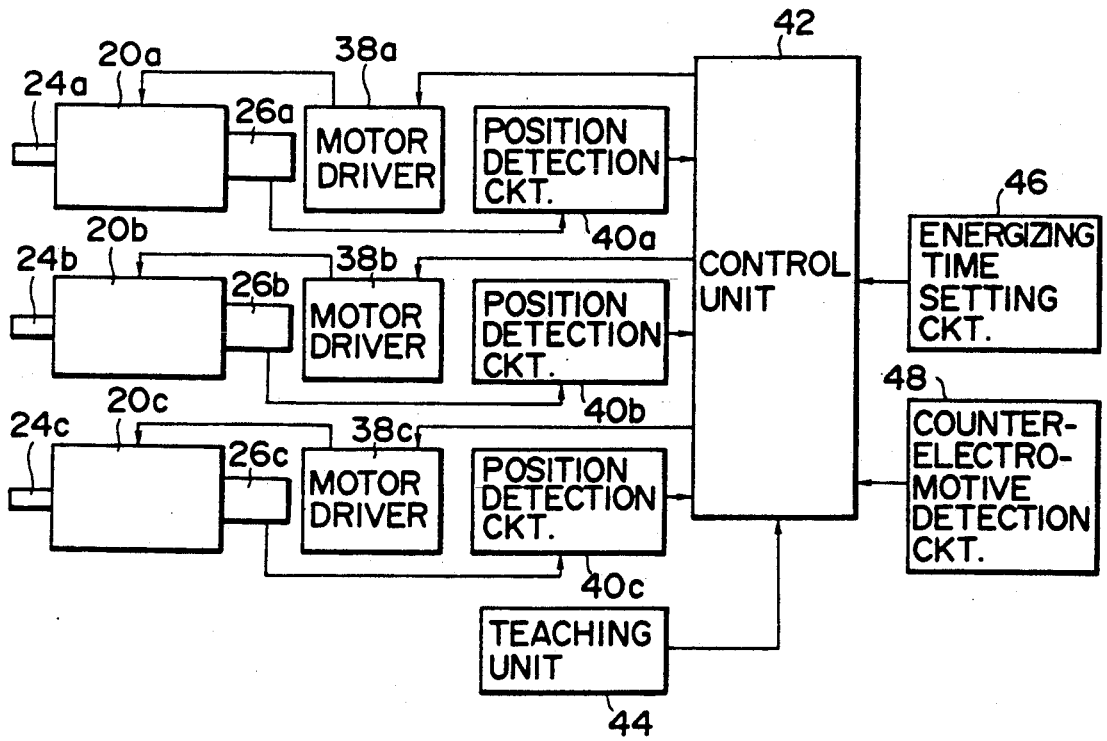
FIG. 3 is a circuit diagram showing a control unit as it is connected to each servo-motor.

On the other hand, as shown in FIG. 3, motor drivers 38a, 38b and 38c are connected to the servomotors 20a, 20b and 20c, respectively and the servo-motors 20a, 20b and 20c are set so as to be drivingly controlled on the basis of driving signals from these motor drivers 38a, 38b and 38c.

Also, the encoders 26a, 26b and 26c for detecting the driving states of the servo-motors 20a, 20b and 20c, i.e., the amounts of rotation of the corresponding drive shafts, are connected to position detection circuits 40a, 40b and 40c, respectively, which are set so as to be capable of accurately detecting the rotational angular positions of the corresponding first arms $L_1$, $L_2$ and $L_3$ on the basis of the detection signals from the corresponding encoders 26a, 26b and 26c.

The motor drivers 38a, 38b and 38c and the position detection circuits 40a, 40b and 40c are connected to an NC control unit 42 which governs the controlling operation of the whole, and a teaching unit 44 for teaching and memorizing the operation procedure of the fingers in advance is connected to the control unit 42. The control unit 42 is set so as to output a control signal to the motor drivers 38a, 38b and 38c so that a workpiece of predetermined shape may be gripped by the three first finger members 36a, 36b and 36c while detecting the current angular positions of the first arms $L_1$, $L_2$ and $L_3$.

Also, as shown in FIG. 3, an energizing time setting circuit 46 and a counterelectromotive force detection circuit 48 are further connected to the control unit 42.

Here, the energizing time setting circuit 46 is designed so as to set the energizing time for the motor coils (not shown) of the servo-motors 20a, 20b and 20c to a predetermined time in order to rotate the first arms $L_1$, $L_2$ and $L_3$ from their initial positions to grip an article $W_A$. This predetermined time is prescribed as the time required until when the first arms $L_1$, $L_2$ and $L_3$ are rotated from their initial positions along a clockwise direction upon starting of the servo-motors 20a, 20b and 20c, the corresponding first finger members 36a, 36b and 36c bear against the outer peripheral surface of the workpiece WA and then press the outer peripheral surface inwardly, whereby a pressure force to the workpiece WA is produced by the first finger members 36a, 36b and 36c and the first finger members become substantially able to grip the workpiece $W_A$.

Also, the counterelectromotive force detection circuit 48 is provided to set the pressure force of the first finger members 36a, 36b and 36c so as to be within a predetermined allowable value. That is, by the first finger members 36a, 36b and 36c being further urged inwardly while bearing against the outer peripheral surface of the workpiece $W_A$, a counterelectromotive force is produced in each of the motor coils of the servo-motors 20a, 20b and 20c, and this voltage value is a value corresponding to the urging force (pressure force) by the first finger members 36a, 36b and 36c. The counterelectromotive force detection circuit detects the counterelectromotive force produced in each motor coil in this manner, and controls the voltage value of this counterelectromotive force so as not to exceed a predetermined value, whereby the pressure force by the first finger members 36a, 36b and 36c is controlled so as to be within a predetermined allowable value.

Description will hereinafter be made of the operation of gripping workpieces of various shapes by the three first finger members 36a, 36b and 36c in the hand apparatus 10 constructed as described above.

First, in a case where a workpiece of any shape is to be gripped, the hand body 18 is moved on the basis of the control procedure of the robot, not shown, so that the three first finger members 36a, 36b and 36c are positioned on the outer periphery of the workpiece to be gripped. Also, the drive cylinder mechanisms 32a, 32b and 32c are set so that compressed air is introduced into one input port of each of then and as a result, the movable second finger members 34a, 34b and 34c are brought into the corresponding first finger members 36a, 36b and 36c.

Where a cylindrical workpiece $W_A$ shown in FIG. A is to be gripped, the control unit 42 outputs a control signal to the motor drivers 38a, 38b and 38c on the basis of the set information from the teaching unit 44 so that the first arms $L_1$, $L_2$ and $L_3$ are rotated along the same direction In response to this control signal, the motor drivers 38a, 38b and 38c output driving signals so as to rotatively drive the corresponding first arms $L_1$, $L_2$ and $L_3$, for example, along a clockwise direction. In this manner, the cylindrical workpiece $W_A$ is reliably gripped, with its outer periphery equally divided, by the three first finger members 36a, 36b and 36c turned with the rotation of the first arms $L_1$, $L_2$ and $L_3$.

Figure 4A:
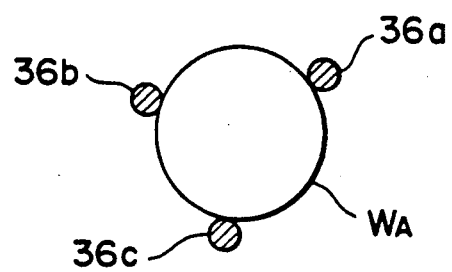
FIGS. 4A to 4D are top plan views showing workpieces of various shapes gripped by the hand apparatus of this embodiment.
Figure 5A:
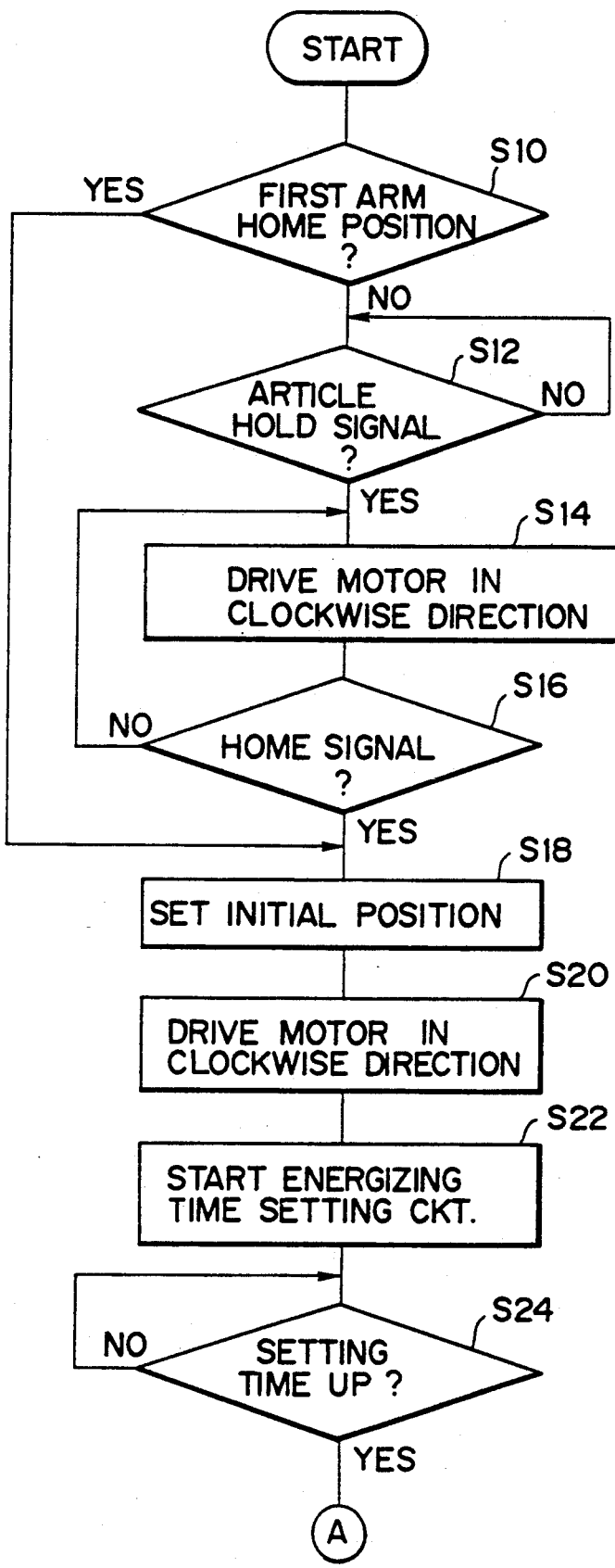
FIGS. 5A and 5B are a flow chart showing the control procedure for gripping the workpiece shown in FIG. 4A.
Figure 5B:
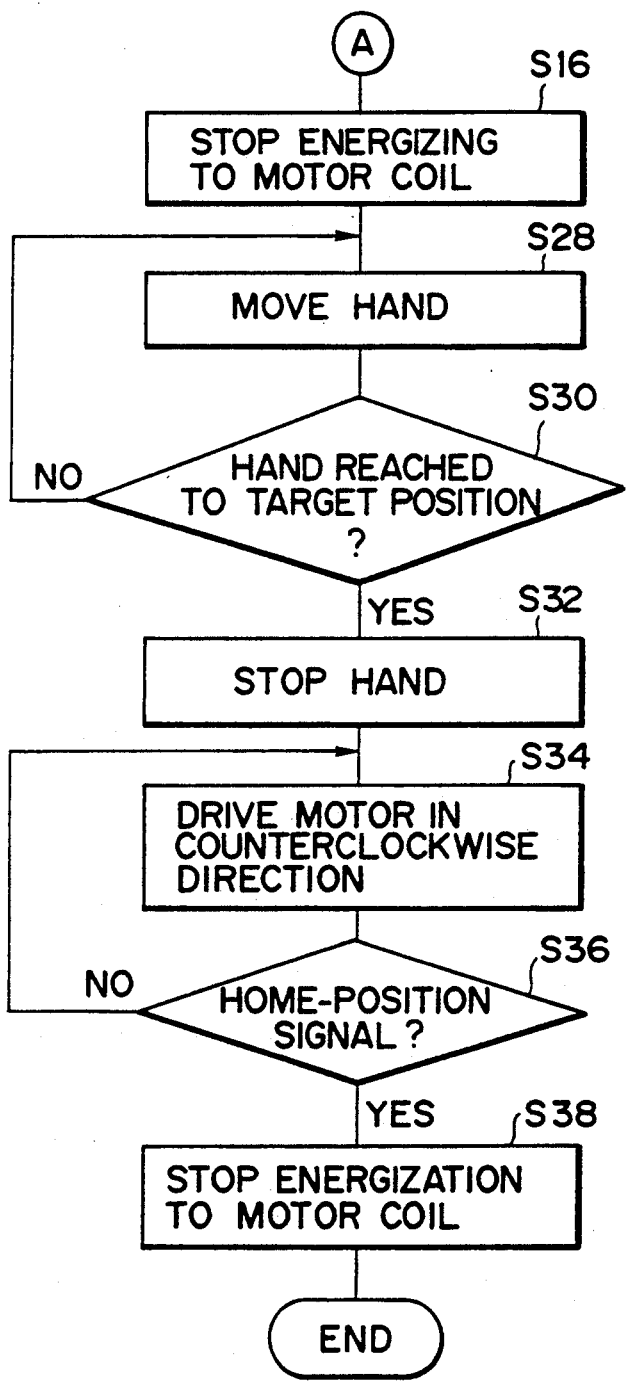

FIGS. 5A and 5B are a flow chart showing the specific control procedure in the control unit 42 for gripping the cylindrical workpiece $W_A$ shown in FIG. 4A by the hand apparatus 10 shown in FIGS. 1 and 2. The control procedure when the cylindrical workpiece $W_A$ is to be gripped will hereinafter be described with reference to this flow chart.

First, as shown at step S10, whether the first arms $L_1$, $L_2$ and $L_3$ are in their home positions is discriminated. If "NO" is judged at this step S10, that is, if it is not confirmed that the first arms $L_1$, $L_2$ and $L_3$ are in their home positions, it is waited at step S12 for an article gripping command signal to be output from the control unit of the robot, not shown and when this article gripping command signal is output, at step 514, the servo-motors 20a, 20b and 20c are driven in a clockwise direction to rotate the corresponding first arms $L_1$, $L_2$ and $L_3$ along a clockwise direction. When the servo-motors 20a, 20b and 20c are being thus driven, it is waited for at step S16 for home position signals to be output from the corresponding encoders 26a, 26b and 26c through the respective position detection circuits 40a, 40b and 40c.

When at step S16, it is detected that the home position signals have been output from the encoders 26a, 26b and 26c, at step S18, the rotated position of the first arms $L_1$, $L_2$ and $L_3$ at this point of time of detection are set as the initial positions, and the amount of rotation of each of the first arms is reset. In this manner, the initial positions of the first arms $L_1$, $L_2$ and $L_3$ are set accurately.

If at step S10, "YES" is judged, that is, if it is confirmed in advance that the first arms $L_1$, $L_2$ and $L_3$ are in their home positions, skip is made directly to step S18 without passing through steps S12, S14 and S16, and the stopped positions of the first arms $L_1$, $L_2$ and $L_3$ are set as the initial positions.

After the initial positions of the first arms $L_1$, $L_2$ and $L_3$ are thus set, the operation of gripping the workpiece $W_A$ in the hand apparatus 10 is started. When the cylindrical workpiece $W_A$ shown in FIG. 4A is to be gripped, the servo-motors 20a, 20b and 20c may be controlled so as to rotate the first arms $L_1$, $L_2$ and $L_3$ by the same amount of rotation in the same direction relative to the axial center line of the connecting rod 16.

That is, when at step S18, the initial positions of the first arms $L_1$, $L_2$ and $L_3$ are set, at step S20, the servo-motors 20a, 20b and 20c are driven in a clockwise direction and the corresponding first arms $L_1$, $L_2$ and $L_3$ are rotatively driven along a clockwise direction. As soon as this step S20 is started, at step S22, a timer, not shown, in the energizing time setting circuit 46 is started and thus, the counting of the preset energizing time is started.

Thereafter, at step S24, the timer started at step S22 is monitored and whether the predetermined energizing time has been used up is discriminated. When at this step S24, it is detected that the predetermined energizing time has been used up, it means that a state in which the workpiece $W_A$ is gripped by the first finger members 36a, 36b and 36c with a sufficient pressure force as described above is achieved and therefore, at step S26, the energization of the motor coils of the servo motors 20a, 20b and 20c is stopped.

When in this manner, the operation of gripping the cylindrical workpiece $W_A$ is terminated in the hand apparatus 10, at step S28, the robot arm 12 is moved on the basis of a control signal from the control unit of the robot, not shown, and with this movement of the robot arm 12, the band apparatus 10 is moved and thus, the workpiece $W_A$ gripped thereby is also moved. When at step S30, it is detected that the hand apparatus 10 has been conveyed to a predetermined position, at step S32, the movement of the robot arm 12 is stopped.

At step S34, the servo-motors 20a, 20b and 20c are driven in a counter-clockwise direction to rotate the corresponding first arms $L_1$, $L_2$ and $L_3$ along a counter-clockwise direction. In this manner, the gripped state of the workpiece $W_A$ by the first finger members 36a, 36b and 36c is released and the workpiece $W_A$ is felt at its moved position. Thereafter, the driving of the servo-motors 20a, 20b and 20c in the counter-clockwise direction is continued until at step S36, home position signals are output from the corresponding encoders 26a, 26b and 26c. At step S36, it is detected that the home position signals have been output from the encoders 26a, 26b and 26c, whereby at step S38, the energization of the servo-motors 20a, 20b and 20c is stopped. In this manner, the first arms $L_1$, $L_2$ and $L_3$ are maintained in their stopped state at their respective home positions.

In this manner, the operation of gripping the workpiece $W_A$ in the hand apparatus 10 is terminated, and the control procedure in the control unit 42 is terminated.

As described above, the hand apparatus 10 of this embodiment is provided with the counterelectromotive force detection circuit 48 and therefore, when this counterelectromotive force detection circuit 48 detects a counterelectromotive force produced in each motor coil until at step S24, the set time is up, the control unit 42, without waiting for the set time to be up, controls so as to cut off the supply of electric power to the servo-motors 20a, 20b and 20c so that the voltage value of this counterelectromotive force does not exceed a predetermined value. In this manner, the pressure forces by the first finger members 36a, 36b and 36c are controlled so as to be within a predetermined allowable value.

Figure 6A:
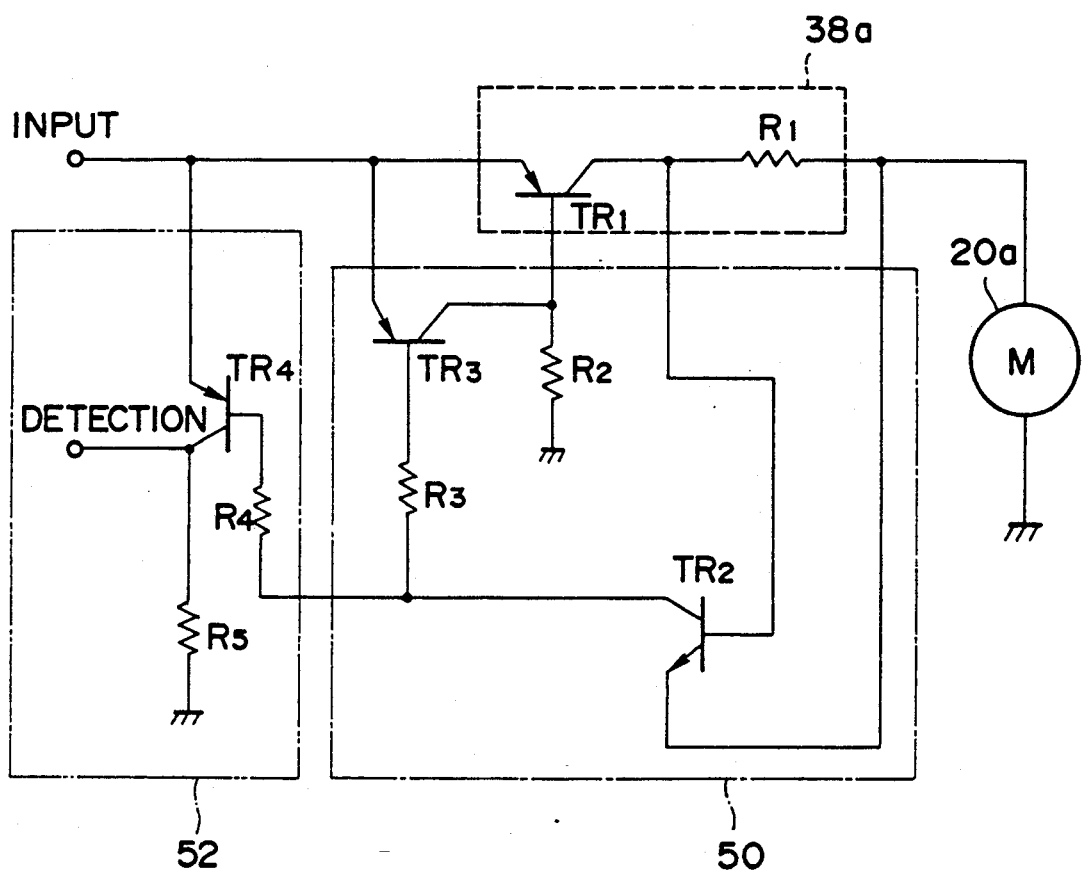
FIG. 6A is a circuit diagram showing the construction of a control system according to another embodiment for gripping the workpiece W shown in FIG. 4.
Figure 6B:
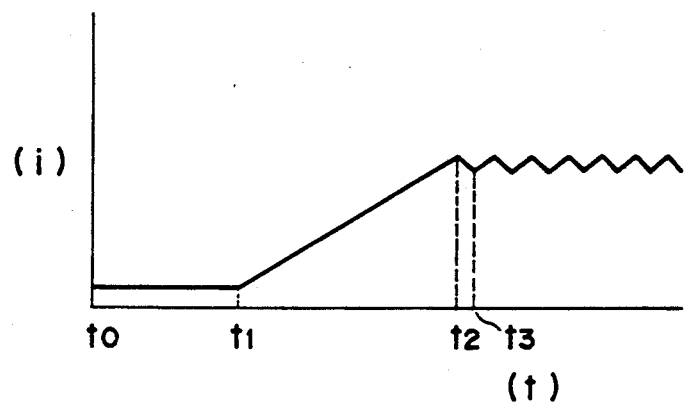
FIG. 6B is a graph showing the state of a detection signal output from a detection end on the basis of the control system shown in FIG. 6A.

While it has been described that in the above-described embodiment, the supply of electric power to the motor coils of the servo-motors 20a, 20b and 20c is cut off in the state in which the workpiece $W_A$ is gripped by the three first finger members 36a, 36b and 36c with a predetermined pressure force, the present invention is not restricted to such a construction, but as shown as another embodiment, for example, in FIGS. 6A and 6B, design may be made such that the supply of electric power to the motor coils is continued to thereby electrically secure the gripped state.

Description will hereinafter be made of the construction of another embodiment is which the amount of electric current supplied to the motor coils is maintained substantially constant after the workpiece $W_A$ is gripped by the three first finger members 36a, 36b and 36c. That is, in said another embodiment which will hereinafter be described, unlike the above-described embodiment, provision is not made of the energizing time setting circuit 46 and the counterelectromotive force detection circuit 48, but instead, a torque holding circuit 50 and a constant torque detection circuit 52 are connected.

In the following description, only the control system in the servo-motor 20a will be described and the control systems in the servo-motors 20b and 20c need not be described, because the control systems in the servo-motors 20a, 20b and 20c are identical to one another.

That is, as shown in FIG. 6A, a motor driver 38a connected to the servo-motor 20a is comprised of an NPN type first transistor $TR_1$ for energization of the motor coils and a first resistor $R_1$, the emitter of the first transistor $TR_1$ being connected to the input end, and the collector of the first transistor $TR_1$ being connected to the motor coil of the servo-motor 20a through the first resistor $R_1$.

A torque holding circuit 50 for holding the pressure force which grips the workpiece $W_A$, i.e., the rotational torque of the first finger member 36a, constant is connected to the motor driver 38a. This torque holding circuit 50, as shown, is comprised of a PNP type second transistor $TR_2$ parallel-connected to both ends of the first resistor $R_1$, an NPN type third transistor $TR_3$ parallel-connected between the base and emitter of the first transistor $TR_1$, and second and third resistors $R_2$ and $R_3$.

More particularly, the base of the second transistor $TR_2$ is connected to the junction between the collector of the first transistor $TR_1$ and the first resistor $R_1$, and the emitter of second transistor $TR_2$ is connected to the junction between the first resistor $R_1$ and the motor coil. Also, the collector of the second transistor $TR_2$ and the base of the third transistor $TR_3$ are connected to each other through the third resistor $R_3$, and the collector of the third transistor $TR_3$ is connected to the base of the first transistor $TR_1$ and is grounded through the second resistor $R_2$.

Also, the constant torque detection circuit 52 for detecting the value of the torque held constant in the torgue holding circuit 50 is provided with an NPN type fourth transistor $TR_4$ and fourth and fifth resistors $R_4$ and $R_5$. That is, the emitter of the fourth transistor $TR_4$ is connected to the above-mentioned input end, the base of the fourth transistor $TR_4$ is connected to the collector of the second transistor $TR_2$ through the fourth resistor $R_4$, and the collector of the fourth transistor $TR_4$ is grounded through the fifth resistor $R_5$. A detection end for detecting a constant torque is connected to the collector of the fourth transistor $TR_4$.

In the control system constructed as described above, when an article gripping command signal is output from the control unit of the robot, not shown, a predetermined voltage is supplied from an input end in conformity with this signal. That is, the first transistor $TR_1$ is turned on in the motor driver 38a by the electric current supplied from said input end and as a result, the electric current passes through the first transistor $TR_1$ and is supplied to the motor coil of the corresponding servo-motor 20a. In this manner, the servo-motor 20a is started and the first arm $L_1$ starts to rotate.

Here, as shown in FIG. 6B, no load acts on the servo-motor 20a from a point of time $t_0$ at which the first arm $L_1$ starts to rotate until a point of time $t_1$ at which the first finger member 36a mounted on the first arm $L_1$ bears against the workpiece $W_A$ and therefore, the electric current flowing to the motor coil, i.e., the torque produced in the servo-motor 20a, is small. As a result, the current value appearing at the detection end is also a small value as shown in FIG. 6B.

Thereafter, when the first finger member 36a bears against the workpiece $W_A$, the rotation of the first arm $L_1$ is precluded and therefore, the load in the servo-motor 20a increases and the value of the electric current, flowing to the motor coil gradually becomes greater. As a result, the potential difference produced across the first resistor $R_1$ rises with the increase in this current. When as shown in FIG. 6B, at a point of time $t_2$, this potential difference becomes higher than the inverted voltage of the second transistor $TR_2$ in the torque holding circuit 50, the second transistor $TR_2$ in the torque holding this point of time and accordingly, the third transistor $TR_3$ is also turned on and as a result, the first transistor $TR_1$ constituting the motor driver 38a is turned off. In this manner, the motor driver 38a stops the supply of electric power to the motor coil and thus, the amount of electric current flowing to the motor coil decreases.

Thereafter, at a point of time $t_3$, the potential difference produced across the first resistor $R_1$ becomes lower than the inverted voltage of the second transistor $TR_2$ and as a result, the second transistor $TR_2$ is turned off and accordingly, the third transistor $TR_3$ is also turned off and as a result, the first transistor $TR_1$ is again turned on and the supply of electric power to the motor coil is resumed.

In this manner, the first transistor $TR_1$ repeats its ON-OFF operation and thus, the amount of electric current supplied to the motor coil, i.e., the torque produced in the servo-motor 20a, is held at a substantially constant value.

On the other hand, the fact that the torque of the servo-motor 20a is thus held constant by the torque holding circuit 50 means that design is made such that the torque is detected by a detection signal output from the detection end of the constant torque detection circuit 52. As a result, when it is detected on the basis of this detection signal from the constant torque detection circuit 52 that a constant torque is produced in the servo-motor 20a, it means that the gripping of the workpiece $W_A$ by the servo-motor 20a is accomplished with a predetermined pressure force and therefore, the control unit of the robot controls so as to start the operation of moving the robot arm 12 and moving the workpiece $W_A$.

In this manner, in the present embodiment, it becomes possible to maintain the workpiece $W_A$ gripped with a predetermined pressure force in a state in which the supply of electric current to the servo-motor 20a is not cut off, but is continued.

Figure 4B:
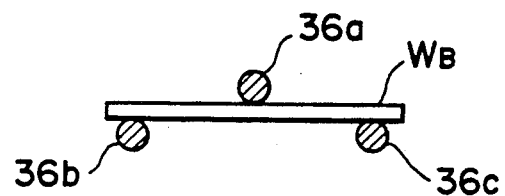

Also, when a rising planar workpiece $W_B$ as shown in FIG. 4B is to be gripped, the control unit 42 outputs a control signal as will hereinafter be described to the motor drivers 38a, 38b and 38c on the basis of the set information from the teaching unit 44. That is, in this case, the three first finger members 36a, 36b and 36c are divided into two groups, i.e., a group of one finger member and a group of two finger members.

Here, to the motor driver 38a for rotatively driving the first finger member 36a isolated into one, a control signal is output so that this first finger member 36a is turned in a direction in which it can bear against the workpiece $W_B$ more quickly. On the other hand, to the motor drivers 38b and 38c for rotatively driving the first finger members 36b and 36c collected into two, a control signal is output so that these finger members bear against the workpiece $W_B$ in a state in which they are open relative to each other (that is, a state in which they are rotated in a direction to be spaced apart from each other). In response to this control signal, the motor drivers 38a, 38b and 38c output driving signals so as to rotatively drive the corresponding arms $L_1$, $L_2$ and $L_3$, for example along a clockwise direction, a counter-clockwise direction and a clockwise direction, respectively.

In this manner, the rising planar workpiece $W_B$ is reliably gripped by the three first finger members 36a, 36b and 36c.

Figure 7A:
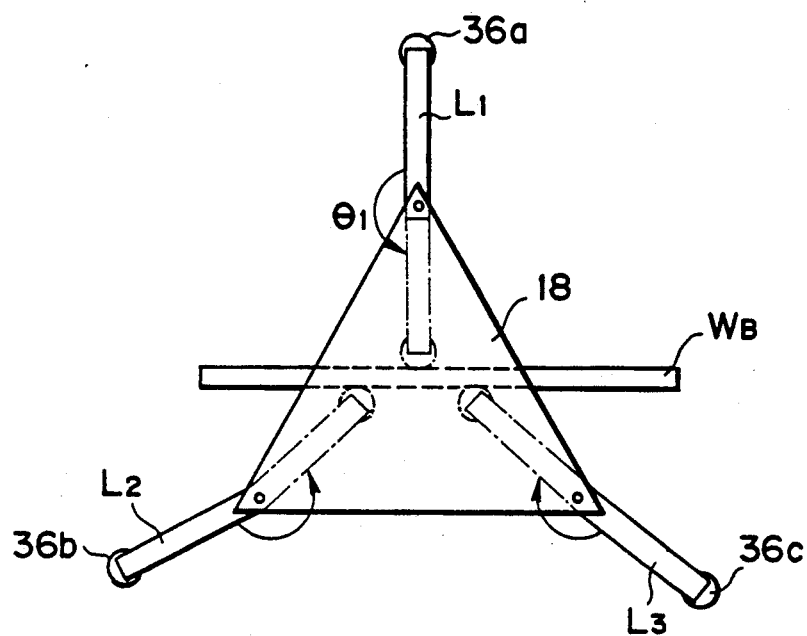
FIG. 7A shows the rotated state of a first finger when gripping the workpiece shown in FIG. 4B.
Figure 7B:
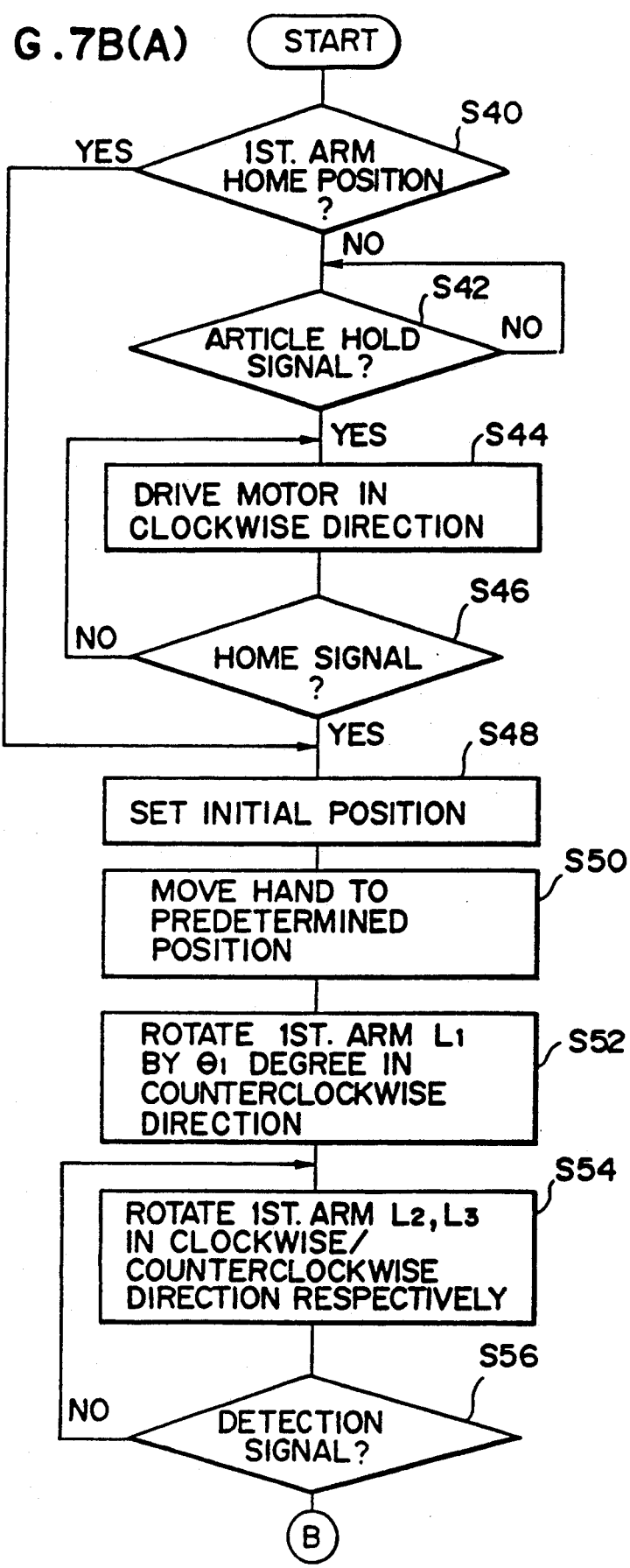
FIG. 7B(A) and 7B(B) are a flow chart showing the control procedure for gripping the workpiece shown in FIG. 4B.
Figure 7B:
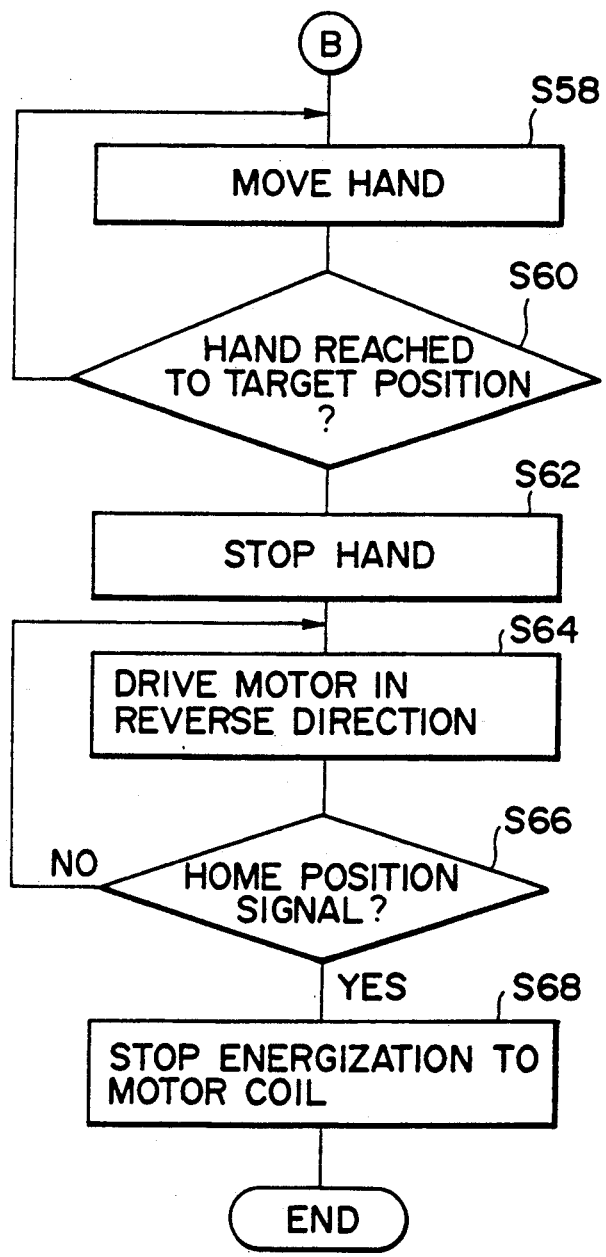

In FIG. 7A, there are shown the rotated states of the first fingers 36a, 36b and 36c when gripping the planar workpiece $W_B$ shown in FIG. 4B, and in FIG. 7B, the control procedure for gripping such a planar workpiece $W_B$ is shown as a flow chart. This control procedure is premised on that a construction in which the supply of electric power to the motor coils is continued to maintain the pressure force even after the operation of gripping the workpiece W has been completed as described above as said another embodiment with respect to the workpiece $W_A$ is adopted as the control system for the servo-motors 20a, 20b and 20c.

First, as shown at step S40, whether the first arms $L_1$, $L_2$ and $L_3$ are in their home positions is discriminated. If at this step S40, "NO" is judged, that is, if it is not confirmed that the first arms $L_1$, $L_2$ and $L_3$ are in their home positions, at step S42, it is waited for for an article gripping command signal to be output from the control unit of the robot, not shown, and when this article gripping command signal is output, at step S44, the servo-motors 20a, 20b and 20c are driven in a clockwise direction to rotate the corresponding first arms $L_1$, $L_2$ and $L_3$ along a clockwise direction. When the servo-motors 20a, 20b and 20c are being thus driven, at step S46, it is waited for for home position signals to be output from the corresponding encoders 26a, 26b and 26c through the position detection circuits 40a, 40b and 40c.

When at step S46, it is detected that the home position signals have been output from the encoders 26a, 26b and 26c, at step S48, the rotated positions of the first arms $L_1$, $L_2$ and $L_3$ at this point of time of detection are set as the initial positions, and the amounts of rotative driving of the respective first arms are reset. In this manner, the initial positions of the first arms $L_1$, $L_2$ and $L_3$ are accurately set. Here, the home positions of the first arms $L_1$, $L_2$ and $L_3$ when gripping the planar workpiece $W_B$ are prescribed by the positions in which the respective first arms $L_1$, $L_2$ and $L_3$ extend outwardly along bisecting lines which bisect the corresponding vertical angles in the hand body 18 constituting a triangle.

If at step S40, "YES" is judged, that is, if it is confirmed that the first arms $L_1$, $L_2$ and $L_3$ are in their home positions in advance, skip is made directly to step S48 without passing through steps S42, S44 and S46, and the stopped positions of the first arms $L_1$, $L_2$ and $L_3$ are set as the initial positions.

After the initial positions of the first arms $L_1$, $L_2$ and $L_3$ are thus set, at step S50, the robot arm 12 is moved to move the hand apparatus 10 to a position in which it assumes a predetermined posture relative to the workpiece $W_B$. This predetermined posture, as shown in FIG. 7A, is set so that the distance from the first finger member 36a separated into one to the workpiece $W_B$ just coincides with the working radius $r_1$ of the first arm $L_1$.

Subsequently, at step S52, the first arm $L_1$ separated into one is rotated by an angle $\theta_1$ along a counter-clockwise direction to a position in which the first finger member 36a contacts with the surface of the workpiece $W_B$, as shown in FIG. 7A, by the corresponding servo-motor 20a being driven.

On the other hand, at step S54, the first arms $L_2$ and $L_3$ collected into two are rotated along a counter-clockwise direction and a clockwise direction, respectively, as shown in FIG. 7A, by the corresponding servo-motors $20b$ and $20c$ being driven. The directions of rotation of these first arms $L_2$ and $L_3$ are suitably determined by the working radii $r_2$ and $r_3$ thereof, the thickness of the workpiece $W_B$, etc. The timing at which at step S52, the first finger member $36a$ contacts with the front surface of the workpiece $W_B$ and the timing at which at step S54, the first finger members $36b$ and $36c$ contact with the back surface of the workpiece $W_B$ are prescribed so as to be identical to each other.

After the three first finger members $36a$, $36b$ and $36c$ have contacted with the front and back surfaces of the workpiece $W_B$, it is discriminated at step S56 that a detection signal is output from the constant torque detection circuit 52. When at this step S56, the outputting of the detection signal from the constant torque detection circuit 52 is detected, it is judged that the workpiece $W_B$ has been reliably gripped by the three first finger members $36a$, $36b$ and $36c$, and at step S58, the robot arm 12 is moved on the basis of the control signal from the control unit of the robot, not shown. With this movement of the robot arm 12, the hand apparatus 10 is moved and the workpiece $W_B$ gripped thereby is also moved.

When at step S60, it is detected that the hand apparatus 10 has been conveyed to a predetermined position, the movement of the robot arm 12 is stopped at step S62. Then, at step S64, the servo-motors $20a$, $20b$ and $20c$ are driven along the directions of rotation opposite to the directions of rotation during the gripping operation to thereby rotate the first arms $L_1$, $L_2$ and $L_3$. Thus, the gripped state of the workpiece $W_B$ by the first finger members $36a$, $36b$ and $36c$ is released and the workpiece $W_B$ is left at its moved position.

Thereafter, the driving of the servo-motors $20a$, $20b$ and $20c$ along the direction opposite to that during the gripping operation is continued until at step S66, home position signals are output from the corresponding encoders $26a$, $26b$ and $26c$. At step S66, it is detected that the home position signals have been output from the encoders $26a$, $26b$ and $26c$, whereby at step S68, the supply of electric power to the servo-motors $20a$, $20b$ and $20c$ is stopped. Thus, the first arms $L_1$, $L_2$ and $L_3$ are maintained stopped at the respective home positions. In this manner, the operation of gripping the workpiece $W_B$ in the hand apparatus 10 is terminated and the control procedure in the control unit 42 is terminated.

Figure 4C:
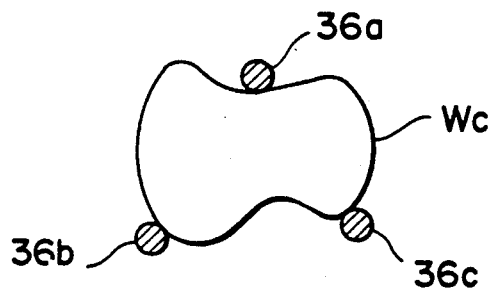

Further, when a workpiece $W_C$ of arbitrary shape as shown in FIG. 4C is to be gripped, the control unit 42 outputs a control signal set so as to be best suited for gripping this workpiece $W_C$ of arbitrary shape at three points to the motor drivers $38a$, $38b$ and $38c$ on the basis of the set information from the teaching unit 44.

In this manner, the workpiece $W_C$ of arbitrary shape is reliably gripped by the three first finger members $36a$, $36b$ and $36c$.

Figure 4D:
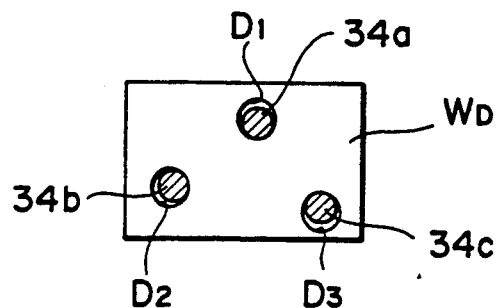

On the other hand, when a workpiece $W_D$ having three holes $D_1$, $D_2$ and $D_3$ for gripping formed in the upper surface thereof as shown in FIG. 4D is to be gripped, the control unit 42 first changes over so as to introduce compressed air into the other input ports of the drive cylinder mechanisms $32a$, $32b$ and $32c$, on the basis of the set information from the teaching unit 44, and renders the movable second finger members (third arms) $34a$, $34b$ and $34c$ capable of being taken out downwardly from the lower ends of the corresponding fixed first finger members (second arms) $36a$, $36b$ and $36c$. Thereafter, the control unit 42 once raises the entire hand apparatus 10, and outputs a control signal to the motor drivers $38a$, $38b$ and $38c$ so that the three movable finger members $34a$, $34b$ and $34c$ are positioned right above the corresponding holes.

Then, the control unit 42 lowers the entire hand apparatus 10 and causes the movable second finger members $34a$, $34b$ and $34c$ to be inserted into the corresponding holes, whereafter it outputs a control signal to the motor drivers $38a$, $38b$ and $38c$ so that the corresponding first arms $L_1$, $L_2$ and $L_3$ are rotated and the movable second finger members $34a$, $34b$ and $34c$ are turned in the respective holes. As a result, the movable second finger members $34a$, $34b$ and $34c$ bear against the peripheral surfaces of the corresponding holes and the workpiece $W_D$ is reliably gripped by these three movable second finger members $34a$, $34b$ and $34c$.

Figure 8A:
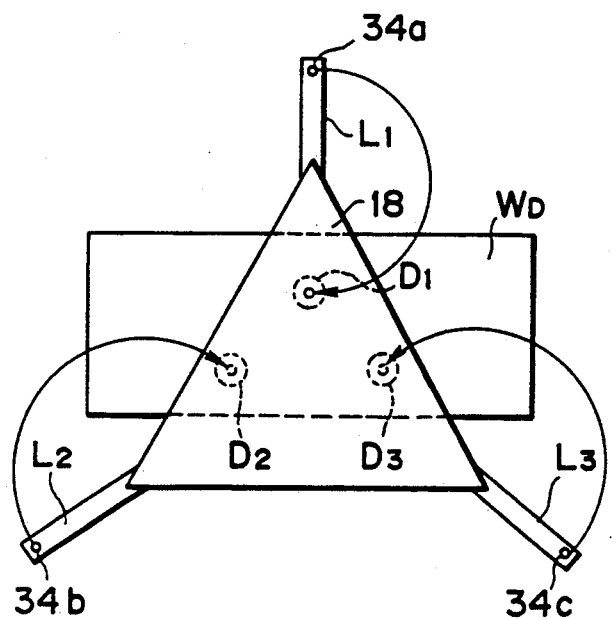
FIG. 8A shows the rotated state of a second finger member when gripping the workpiece W shown in FIG. 4D.
Figure 8B:
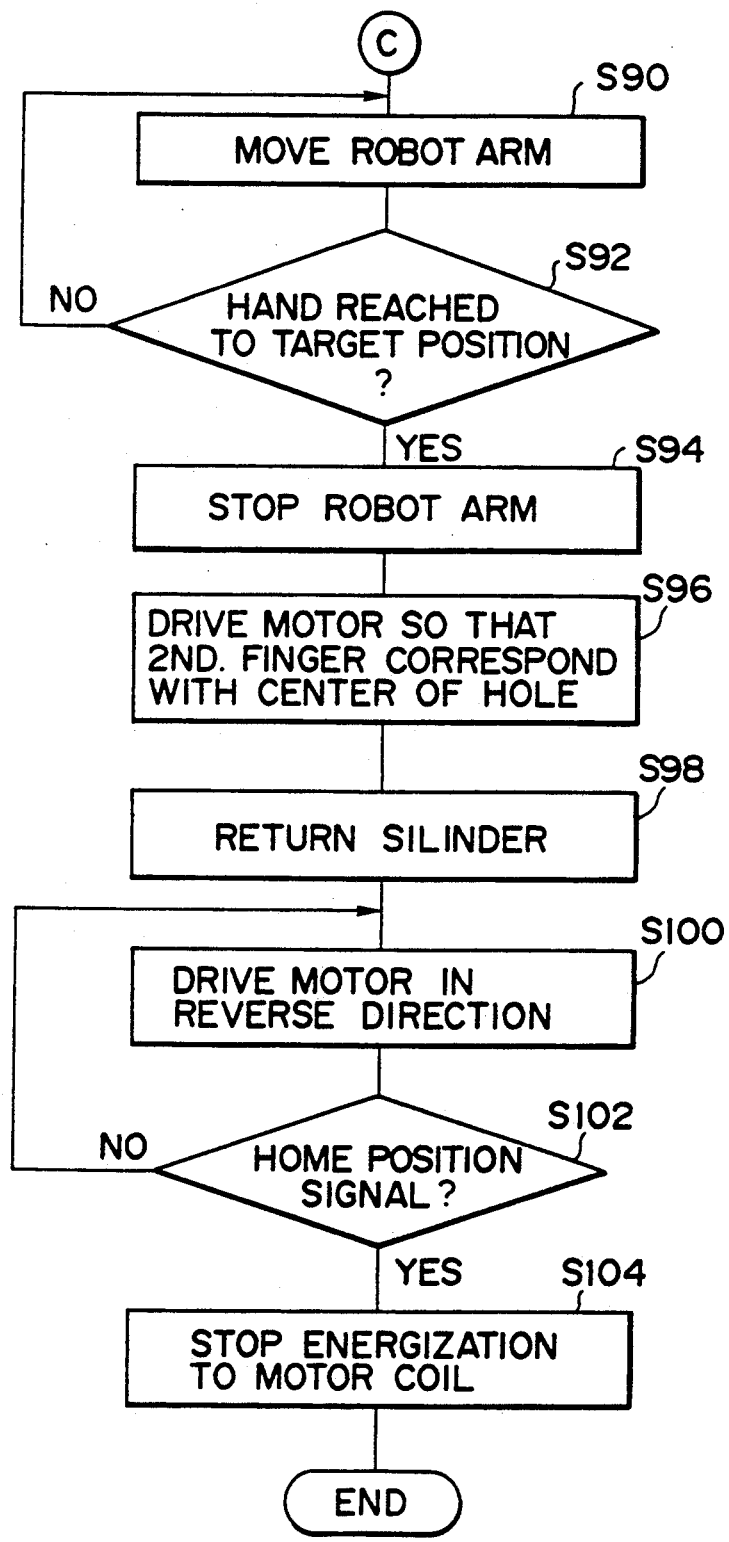
FIGS. 8B(A) and 8B(B) are a flow chart showing the control procedure for gripping the workpiece shown in FIG. 4D.

In FIG. 8A, there are the rotated states of the first fingers $36a$, $36b$ and $36c$ when gripping the holed workpiece $W_D$ shown in FIG. 4D, and in FIG. 8B, the control procedure for gripping such a holed workpiece $W_D$ is shown as a flow chart. This control procedure is premised on that as in the case of the above-described workpiece $W_B$, a construction in which the supply of electric power to the motor coils is continued to maintain the pressure force even after the operation of gripping the workpiece $W_D$ has been completed is adopted as a control system for the servo-motors $20a$, $20b$ and $20c$.

First, as shown at step S70, whether the first arms $L_1$, $L_2$ and $L_3$ are in their home positions is discriminated. If at this step S70, "NO" is judged, that is, if it is not confirmed that the first arms $L_1$, $L_2$ and $L_3$ are in their home positions, at step S72, it is waited for an article gripping command signal to be output from the control unit of the robot, not shown, and when this article gripping command signal is output, at step S74, the servo-motors $20a$, $20b$ and $20c$ are driven in a clockwise direction to rotate the corresponding first arms $L_1$, $L_2$ and $L_3$ along a clockwise direction. When the servo-motors $20a$, $20b$ and $20c$ are being thus driven, at step S76, it is waited for home position signals to be output from the corresponding encoders $26a$, $26b$ and $26c$ through the respective position detection circuits $40a$, $40b$ and $40c$.

When at step S76, it is detected that the home position signals have been output from the encoders $26a$, $26b$ and $26c$, at step S78, the rotated positions of the first arms $L_1$, $L_2$ and $L_3$ at this point of time of detection are set as the initial positions and the amounts of rotative driving thereof are reset. In this manner, the initial positions in the first arms $L_1$, $L_2$ and $L_3$ are set accurately.

Here, the home positions of the first arms $L_1$, $L_2$ and $L_3$ when gripping the holed workpiece $W_D$, as in the case of the planar workpiece $W_B$, are prescribed by the positions at which the first arms $L_1$, $L_2$ and $L_3$ extend outwardly along bisecting lines which bisect the corresponding vertical angles in the hand body 18 constituting a triangle.

If at step S70, "YES" is judged, that is, if it is confirmed that the first arms $L_1$, $L_2$ and $L_3$ are in their home positions in advance, skip is made directly to step S78 without passing through steps S72, S74 and S76, and the stopped positions of the first arms $L_1$, $L_2$ and $L_3$ are set as the initial positions.

After the initial positions of the first arms $L_1$, $L_2$ and $L_3$ have been thus set, at step S80, the servo-motors 20a, 20b and 20c are driven so that the center positions of the second finger members 34a, 34b and 34c coincide with the center positions of the corresponding holes $D_1$, $D_2$ and $D_3$, as shown in FIG. 8A. The amounts and directions of rotation of these servo-motors 20a, 20b and 20c are determined in the control unit 42 so that the operation time is shortest.

Subsequently, at step S82, the robot arm 12 is moved to thereby move the hand apparatus 10 to a predetermined position. This predetermined position is prescribed by the second finger members 34a, 34b and 34c being brought to the positions right above the corresponding holes $D_1$, $D_2$ and $D_3$, respectively, as shown in FIG. 7A.

Then, at step S84, the drive cylinder mechanisms 32a, 32b and 32c are started to move the second finger members 34a, 34b and 34c so as to protrude downwardly from the corresponding first finger members 36a, 36b and 36c. As a result, the second finger members 34a, 34b and 34c are inserted into the corresponding holes $D_1$, $D_2$ and $D_3$, respectively. The amounts of downward protrusion of these second finger members 34a, 34b and 34c are determined to predetermined values by a driving signal from the control unit 42.

Thereafter, at step S86, the servo-motors 20a, 20b and 20c are driven and rotated along a clockwise direction, a counter-clockwise direction and a clockwise direction, respectively. The directions of rotation of the first arms $L_2$ and $L_3$ can be prescribed so that the direction of rotation of one of the servo-motors differs from the direction of rotation of the other two servo-motors.

In this manner, the three second finger members 34a, 34b and 34c bear against the inner peripheral surfaces of the corresponding holes $D_1$, $D_2$ and $D_3$ in the workpiece $W_D$, and the workpiece $W_D$ is gripped by these second finger members 34a, 34b and 34c. After the gripping operation has been thus performed, at step S88, it is detected that a detection signal is output from the constant torque detection circuit 52.

When at this step S88, the outputting of the detection signal from the constant torque detection circuit 52 is detected, it is judged that the workpiece $W_D$ has been reliably gripped by the three first finger members 36a, 36b and 36c, and at step S90, the robot arm 12 is moved on the basis of a control signal from the control unit of the robot, not shown. With this movement of the robot arm 12, the hand apparatus 10 is moved and the workpiece $W_D$ gripped thereby is also moved.

When at step S92, it is detected that this hand apparatus 10 has been conveyed to a predetermined position, at step S94, the movement of the robot arm 12 is stopped. Then, at step S96, the servo-motors 20a, 20b and 20c are driven and rotated until the center positions of the second finger members 34a, 34b and 34c coincide with the center positions of the corresponding holes $D_1$, $D_2$ and $D_3$. By this rotation, the gripped state of the workpiece $W_D$ is released.

Thereafter, at step S98, the drive cylinder mechanisms 32a, 32b and 32c are returned to their initial positions and as a result, the second finger members 34a, 34b and 34c are pulled out upwardly from the corresponding holes $D_1$, $D_2$ and $D_3$, and the workpiece $W_D$ is left at its moved position. Then, at step S100, the servo-motors 20a, 20b and 20c are driven along the direction of rotation opposite to the direction of rotation determined at step S80, whereby the first arms $L_1$, $L_2$ and $L_3$ are rotated.

Thereafter the driving of the servo-motors 20a, 20b and 20c is continued until at step S102, home position signals are output from the corresponding encoders 26a, 26b and 26c. At step S102, it is detected that the home position signals have been output from the encoders 26a, 26b and 26c, whereby at step S104, the supply of electric power to the servo-motors 20a, 20b and 20c is stopped. In this manner, the first arms $L_1$, $L_2$ and $L_3$ are maintained stopped at their respective home positions. In this manner, the operation of gripping the workpiece $W_D$ in the hand apparatus 10 is terminated, and the control procedure in the control unit 42 is terminated.

As described above in detail, according to this embodiment, the hand apparatus 10 becomes able to grip the workpiece as a part by the three finger members (irrespective of the fixed first finger members 36a, 36b and 36c or the movable second finger members 34a, 34b and 34c) and can therefore function as a so-called versatile hand apparatus, and if only one such hand apparatus is prepared for the arm 12 of the robot, it will become applicable for workpieces of various shapes and thus, it will become unnecessary to prepare various hand apparatuses in advance, and it will become possible to achieve a reduction in cost and achieve effective utilization of space.

Of course, the present invention is not restricted to the construction of the above-described embodiment, but can be modified variously without departing from the gist of the invention.

For example, in the above-described embodiment, the first finger members 36a, 36b and 36c contain the movable second finger members 34a, 34b and 34c therein and even if any of these finger members are used, the workpiece is gripped by the utilization of frictional engagement force, whereas the present invention is not restricted thereto, but design may be made such that vacuum tubes or vacuum pads are adopted instead of the movable second finger members 34a, 34b and 34c and a part is gripped by the utilization of the suction force of the vacuum tubes or the vacuum pads. By such design, more suitable one of the utilizaiton of frictional engagement force and the utilization of suction force in dependence of the shape of a part to be gripped is selectively adopted and it becomes possible to grip the part more reliably and more efficiently.

Also, in the above-described embodiment, fixed and movable finger members for utilizing frictional engagement force are provided as the finger members, whereas the present invention is not restricted thereto, but of course, for example, vacuum tubes or vacuum pads may be provided as the finger members so that a part may be gripped by suction force.

Further, in the above-described embodiment, the lower end of the connecting rod 16 is connected at the center of gravity of the hand body 18, whereas this is not restrictive, but said lower end may be connected at any location on the hand body 18.

As described above, the part gripping hand apparatus according to the present invention is provided with a hand body holding at least three shafts, first arms supported by said shafts and pivotable about the axes of said shafts, means for rotating said shafts, and second arms mounted on said first arms, and is characterized in that said three shafts are mounted on said hand body at the positions of vertical angles substantially depicting a triangle, and the radius of rotation of each of said first arm is set to be shorter than the length of one of two sides forming the corresponding vertical angle.

Also, the article gripping hand apparatus according to the present invention is characterized in that said second arms each comprise a hollow member in which an expandable and contractible third arm is contained.

Also, the article gripping hand apparatus according to the present invention is characterized by the provision of a hand body, at least three shafts mounted on said hand body, rotating means for rotating said shafts, first arms mounted on said shafts, fingers provided on said first arms for gripping an article, control means for controlling the rotation of said first arms to grasp the article by said fingers and prescribing the direction and angle of rotation of said rotating means, and teaching means for teaching said control means the direction and angle of rotation of said rotating means.

Also, the article gripping hand apparatus according to the present invention is characterized by the provision of a hand body, at least three shafts mounted on said hand body, rotating means for rotating said shafts, finger members rotatable by the rotation of said shafts to thereby reduce the distances between said finger members and thereby grip an article, and torque holding means connected to said rotating means for keeping the rotational force thereof constant.

Also, the article gripping hand apparatus according to the present invention is further characterized by the provision of detecting means for detecting a signal output from said torque holding means, said detecting means effecting the confirmation of the gripping operation by said signal.

Thus, according to the present invention, there is provided a versatile part gripping hand apparatus which can singly grip parts of various shapes reliably.

Also, according to the present invention, there is provided an article gripping hand apparatus which has at least three fingers for gripping an article and in which each of said fingers is provided with independent drive means so that the amounts and directions of movement of said fingers can be made different and which can make said drive means perform an operation conforming to an article to be gripped.

Also, according to the present invention, there is provided an article gripping hand apparatus in which first arms are fixed to three shafts rotatable independently of one another, fingers for gripping an article are mounted on said first arms and expandable and contractible second fingers can be provided for said fingers.

Also, according to the present invention, there is provided an article gripping hand apparatus having at least three finger members to which a drive force is imparted by drive means, for example, motors, and wherein the reliability of article gripping can be improved.

Also, according to the present invention, there is provided an article gripping hand apparatus in which a signal indicative of having gripped an article by finger members is output and which can shift to the next step by this grip signal.

What is claimed is:

1. A hand apparatus, comprising:

a hand body supporting three shafts, with said shafts having a longitudinal axis and being spaced a predetermined distance from each other;

three motors, each for rotating one of said shafts, with each said motor being aligned along the longitudinal axis of said respective shaft;

a first arm connected to each said shaft and being supported in a direction perpendicular to the longitudinal axes of said respective shaft and rotated by one of said respective motors, with said first arms having a length l;

a second arm connected to each said first arm and elongated in a direction parallel with the longitudinal axis of each said respective shaft, said second arms each comprising a hollow portion;

a third arm disposed in each hollow portion of said second arms;

means for axially moving said third arms; and means for detecting rotational movement of said first arms, wherein the length l of one of said first arms is less than the individual lengths l of said two other first arms and wherein each first arm can independently rotate 360° about its respective shaft.

2. A hand apparatus, comprising:

a hand body;

three shafts supported on said hand body;

means for rotating said shafts;

three first arms connected on said shafts, said first arms each having a finger for gripping an article and being positioned in a home position prior to gripping the article; and a control unit for controlling rotation of said first arms to grip the article by said fingers, said control unit having teaching means which detects whether said first arms re in their home positions, moves said first arms to the home positions if they are not in the home positions, detects the rotational direction of said shafts, detects an operation time of the rotation and controls the rotation so that a gripping force of said finger falls within a predetermined level.

3. A gripping apparatus for gripping an article having holes, comprising:

a hand body having a plurality of rotation shafts;

a motor for rotating said rotation shafts;

first arms connected to said rotation shafts and extending in a direction perpendicular to longitudinal axes of said rotation shafts;

a first finger member having a longitudinal axial direction and being provided on each said first arm and elongated in the direction parallel to the longitudinal axes of said rotation shafts;

a second finger member supported at a terminal end of each said first finger member, with said second finger member being capable of telescoping linear movement in the longitudinal axial direction of said first finger member;

means for driving said first finger member to a position near the holes of the article by rotating said motor;

means for driving said second finger member into the holes of the article; and means for gripping the article by rotating said first arms after said second finger members are driven into the holes of the article.

* * * * *

UNITED STATES PATENT AND TRADEMARK OFFICE
CERTIFICATE OF CORRECTION

PATENT NO. : 5,161,846

DATED : November 10, 1992

INVENTOR(S) : Takeshi Yakou

It is certified that error appears in the above-identified patent and that said Letters Patent is hereby corrected as shown below:

IN THE DRAWINGS:

SHEET 11:

FIG. 8B(B), "SILINDER" should read --CYLINDER--.

COLUMN 2:

Line 59, "W" should read --$W_D$--.

COLUMN 4:

Line 36, "(" (right parenthesis) should be deleted and insert --$\ell$--.

COLUMN 5:

Line 19, "WA" should read --$W_A$--.
Line 21, "WA" should read --$W_A$--.
Line 54, "then" should read --them--.
Line 57, "FIG. A" should read --FIG. 4A--.

COLUMN 8:

Line 32, "torgue" should read --torque--.

UNITED STATES PATENT AND TRADEMARK OFFICE
CERTIFICATE OF CORRECTION

PATENT NO. : 5,161,846

DATED : November 10, 1992

INVENTOR(S) : Takeshi Yakou

It is certified that error appears in the above-identified patent and that said Letters Patent is hereby corrected as shown below:

<u>COLUMN 16</u>:

Line 22, "each" should read --each said--.
Line 35, "re" should read --are--.

Signed and Sealed this

Twenty-first Day of December, 1993

Attest:

BRUCE LEHMAN

Attesting Officer      Commissioner of Patents and Trademarks